(12) United States Patent
Hamlyn et al.

(10) Patent No.: US 8,667,999 B2
(45) Date of Patent: Mar. 11, 2014

(54) FIBER APPLICATION MACHINE PROVIDED WITH FLEXIBLE FIBER CONVEYING TUBES ARRANGED WITHIN A COLD SHEATH

(75) Inventors: Alexander Hamlyn, Ploemeur (FR); Yvan Hardy, Lorient (FR)

(73) Assignee: Coriolis Composites, Lyons (FR)

( * ) Notice: Subject to any disclaimer, the term of this patent is extended or adjusted under 35 U.S.C. 154(b) by 132 days.

(21) Appl. No.: 13/126,736

(22) PCT Filed: Oct. 27, 2009

(86) PCT No.: PCT/EP2009/064156
§ 371 (c)(1),
(2), (4) Date: Aug. 2, 2011

(87) PCT Pub. No.: WO2010/049424
PCT Pub. Date: May 6, 2010

(65) Prior Publication Data
US 2011/0272126 A1    Nov. 10, 2011

(30) Foreign Application Priority Data
Oct. 28, 2008 (FR) .................... 08 57316

(51) Int. Cl.
*B29C 70/38* (2006.01)
(52) U.S. Cl.
USPC ............ 156/433; 156/441; 156/523; 156/573

(58) Field of Classification Search
USPC .................. 156/523, 573, 433, 441, 497, 498
See application file for complete search history.

(56) References Cited

U.S. PATENT DOCUMENTS

| 5,110,395 | A | * | 5/1992 | Vaniglia ........................ 156/353 |
| 5,979,531 | A | * | 11/1999 | Barr et al. ...................... 156/574 |
| 6,096,164 | A | * | 8/2000 | Benson et al. ................. 156/425 |
| 6,808,378 | B2 | | 10/2004 | Wirth et al. |
| 7,819,160 | B2 | | 10/2010 | Hamlyn et al. |
| 2009/0229760 | A1 | | 9/2009 | Hamlyn et al. |

FOREIGN PATENT DOCUMENTS

| EP | 1 177 871 A2 | 2/2002 |
| FR | 2 882 681 A1 | 9/2006 |
| FR | 0 912 953 A1 | 8/2008 |
| WO | WO 2006/092514 A2 | 9/2006 |

* cited by examiner

*Primary Examiner* — Jeff Aftergut
(74) *Attorney, Agent, or Firm* — Patterson Thuente Pedersen, P.A.

(57) ABSTRACT

A fiber application machine for the production of composite material parts, comprising a system for displacing a fiber application head, a fiber storage, and a fiber conveyor for conveying the fibers from the fiber storage to the application head, the fiber conveyor being placed in the internal passage of at least one flexible tubular sheath, the machine further comprising a cooling system adapted to inject cold gas in the internal passage of the sheath.

12 Claims, 6 Drawing Sheets

FIBER APPLICATION MACHINE PROVIDED WITH FLEXIBLE FIBER CONVEYING TUBES ARRANGED WITHIN A COLD SHEATH

PRIORITY CLAIM

The present application is a National Phase entry of PCT Application No. PCT/EP2009/064156, filed Oct. 27, 2009, which claims priority from French Application No. 0857316, filed Oct. 28, 2008, the disclosures of which are hereby incorporated by reference herein in their entirety.

TECHNICAL FIELD

The present invention relates to a fiber application machine for the production of parts made of composite material, and more particularly, particular fiber conveyor of such a machine for conveying the fibers between fiber storage and the application head.

BACKGROUND ART

There have been known fiber application machines, commonly designated by fiber placement machines, for applying a wide strip, formed of a plurality of ribbon-type resin impregnated flat fibers, particularly carbon fibers impregnated with a thermoplastic or thermosetting resin, onto a male or female mold. These machines, such as described in patent document WO2006/092514 comprise a system for displacing a fiber application head, a fiber storage, and a fiber conveyor for conveying the fiber from the fiber storage to the application head.

Typically, the fiber application head, also called fiber placement head, comprises an application roller intended to come into contact against the mold in order to apply the strip, and a guiding system for guiding the fibers on said application roller.

The displacement system allows for the displacement of the application head according to at least three directions perpendicular to one another. The displacement system may be constituted by a standard six axis robot-type polyarticulated arm, arranged on the floor or mounted over a linear axis, with an end wrist to which the application head is attached, or a gantry-type Cartesian-coordinate robot provided with an end wrist carrying the application head. In the case of fibers packaged in the form of spools, the fiber storage typically comprise a creel. The creel is arranged on the floor, in the case of a stationary six axis standard robot, for example, or may be mounted on a member of the displacement system, on one of the carriages of the Cartesian-coordinate robot or on a follower-carriage sliding on the linear axis of the six axis robot for example.

Such as described in the aforementioned patent document, the fiber conveyor is advantageously formed of flexible tubes connecting the fiber storage to the application head, each flexible tube being able to receive a fiber in its internal passage. The flexible tubes are attached by their ends to the application head and the fiber storage, respectively, through an upstream and downstream fixing system and have sufficient length and flexibility so as not to limit the movements of the head displacement system.

Owing to the stickiness of the pre-impregnated fibers, the application head and the flexible tubes may have a tendency to clog up.

In patent document FR 2 912 953 filed by the present applicant, it has been proposed to inject compressed air in each tube in order to fluidize the transport of fibers. With regard to pre-impregnated fibers of which stickiness decreases with temperature, compressed air is advantageously cooled so as to limit the clogging of the tubes as well as the friction of fibers inside the tubes. Owing to the low cross-section of the tubes, the compressed air injection system is provided so as it directly injects compressed air within each tube. Such a compressed air injection system proves to be complex, and the cooling of the compressed air proves to be also difficult to implement and sometimes not sufficient.

SUMMARY OF THE INVENTION

Embodiments of the present invention aim to provide a machine overcoming the aforementioned drawbacks, of simple construction, while ensuring a proper fiber conveying.

To this end, embodiments of the present invention provide a fiber application machine comprising a displacement system for displacing a fiber application head, fiber storage, and fiber conveyor for conveying the fibers from the fiber storage to the application head, wherein the fiber conveyor are placed in the internal passage of at least one flexible tubular sheath, the machine further comprising a cooling system able to inject a cold gas in said internal passage of the sheath, preferably from the upstream end of the sheath.

According to embodiments of the invention, the fiber conveyor are placed in the internal passage of at least one sheath, called cold sheath, which is cooled with a cold gas injected in its internal passage, so as to be cooled and held at low temperature, at which the resin pre-impregnated fibers remain not very sticky.

Advantageously, the fiber conveyor comprise flexible tubes, each flexible tube being able to receive a fiber in its internal passage and being fixedly mounted by its ends thereof between the fiber storage and the application head by upstream and downstream fixing system, the flexible tubes being placed within the internal passage of at least one flexible tubular sheath. The entirety of flexible tubes may thus be easily cooled from the outside. Each flexible tube is placed within the internal passage of a cold sheath, the machine comprising one or more cold sheaths. According to an embodiment, the fiber application machine includes one single sheath, the flexible tubes being gathered all together within the sheath. Alternatively, the machine comprises a plurality of sheaths within the internal passages of which the flexible tubes are distributed. For example, the machine comprises two cold sheaths, each sheath receiving flexible tubes of a layer of fibers.

According to other embodiments, the fiber conveyor are constituted by various pulley systems, the pulley systems being thus placed in at least a cold sheath according to embodiments of the invention.

In an embodiment, the sheath extends from an upstream end arranged at the fiber storage to an open downstream end arranged at the application head, the cold gas injector adapted to inject a cold gas within the internal passage of the sheath from the upstream end of the sheath, the injector creating, within the sheath, a stream of cold gas oriented towards the application head, exiting from the open downstream end.

Accordingly, the cold sheath makes it possible to also cool the application head, the stream of cold air exiting from the downstream end of the sheath particularly cooling the fiber guiding system, before the fiber comes over the roller.

According to an embodiment, the sheath is assembled par its upstream end and its downstream end, to the fiber storage and the application head respectively, through upstream and downstream fixing system, respectively, the sheath exhibiting a sufficient length and flexibility so as not to limit the movement of the head displacement system.

According to an embodiment, the machine includes a slack recovery system, or tensioning system, acting upon the sheath in a manner in which at least the downstream part of the sheath remains substantially tight, whatever the head position is.

According to an embodiment, the slack recovery system includes an elastic return system elastically connecting a point of the sheath to a point of the machine which is fixed with respect to the fiber storage, such that the sheath forms a first strand of variable length connected to the fiber storage and connected via a bend portion to a second strand of variable length, the second strand comprising the sheath downstream part, the elastic return system being connected at a point of the second strand and/or of the bend portion.

According to an embodiment, the elastic return system further includes at least one automatic cable winder, for example, a spring-type cable winder, one of the members among the winder and the free end of its cable being connected to the point of the machine, the other member being connected to the second strand or to the bend portion of the sheath.

According to an embodiment, the slack recovery system includes a slider mounted on a rail fixed to the fiber storage, said slider being connected to the sheath via a cable and elastically connected via said automatic cable winder to an end of the rail opposed to the application head, the cable connecting the slider to the sheath, being preferably the cable of a second automatic winder. This rail-mounted slider and dual cable winder system makes it possible to reduce the distance between the head and the fixed point of the machine to which one of the winders is assembled.

According to an embodiment, the displacement system includes a six axis robot type poly-articulated arm preferably mounted mobile on a linear axis, the fiber storage comprising a creel to accommodate fiber spools, integrated within a cabinet and preferably mounted mobile on the linear rail, the first strand of the sheath constitutes together with the bend portion and the second strand a variable size loop arranged above the creel, the rail of the slack recovery system, when provided, being mounted on the creel, above the creel parallel to the linear axis.

According to another embodiment, the displacement system is a Cartesian displacement system including a first carriage movably mounted according to a horizontal direction, and a second carriage, also called sliding carriage, mounted vertically mobile on the first carriage and provided at its lower end with a robot wrist carrying the head, the fiber storage comprising at least one creel for receiving fiber spools, preferably integrated within a cabinet and mounted either on the first carriage, preferably in the event of a gantry-type displacement system, the first strand of the sheath then forming with the bend portion and the second strand a variable size loop arranged vertically at the creel, substantially along the median plane of the sliding carriage, or on the second carriage, preferably in the event of a columnar-type displacement system.

Advantageously, the displacement system is provided with a guiding ring in which the second strand of the sheath is passed.

Advantageously, the cooling system comprise a cooling unit able to form a stream of pulsed cool air within the internal passage of the sheath, the cooling unit being preferably integral with the fiber storage. The use of such a sheath makes it possible to use a simple and inexpensive pulsed air system to form a cool sheath. The sheath exhibits a transversal cross-section larger than the sum of the transversal cross-sections of the tubes passing through the sheath, such that pulsed cool air flows easily within the sheath, around and between the flexible tubes.

The invention will be better understood, and other aims, details, features and advantages will become more apparent from the following detailed explanatory description of three described particular embodiments of the invention, with reference to the accompanying schematic drawings in which:

DETAILED DESCRIPTION

Figure 1:
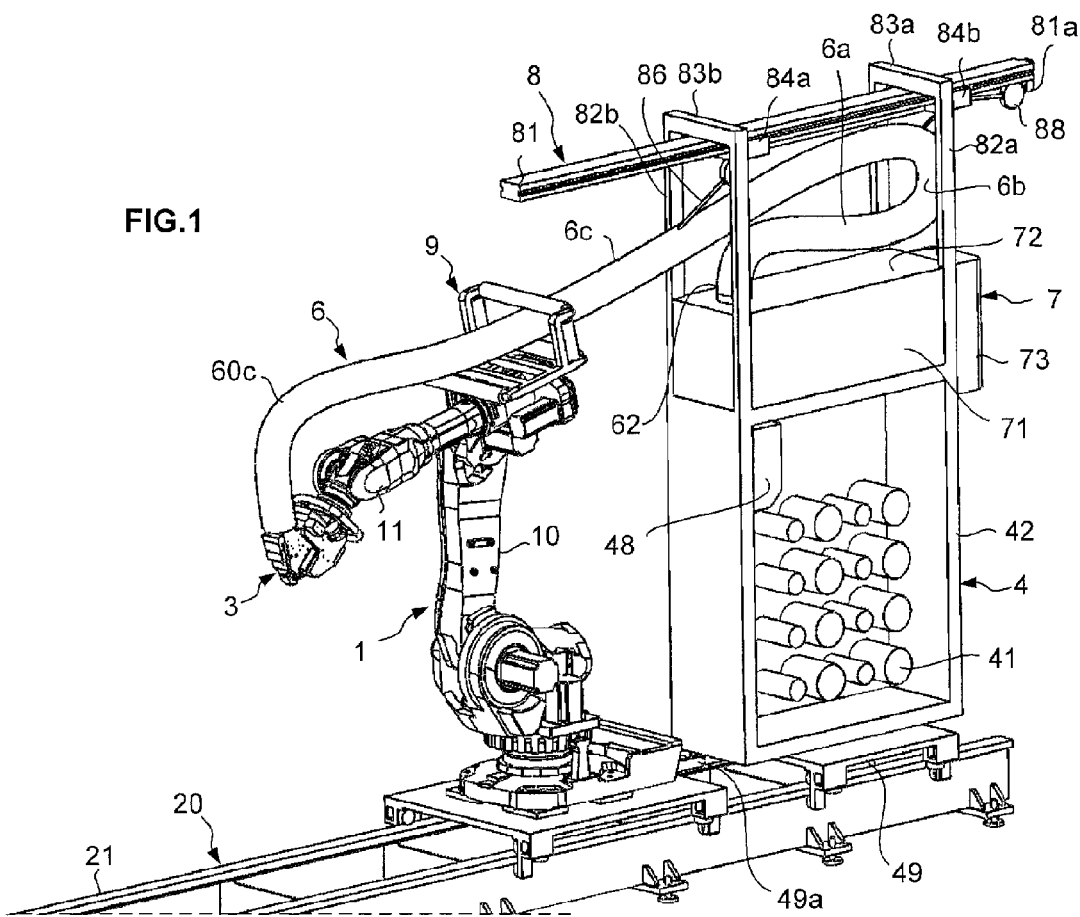
FIG. 1 is a schematic perspective view of a placement machine according to a first embodiment of the invention, wherein the displacement system comprises a standard six axis robot type poly-articulated arm mounted on a linear axis.

FIGS. 1 to 6B illustrate a first embodiment of the invention. With reference to FIG. 1, the placement machine includes a displacement system 1 composed of a six axis robot type poly-articulated arm 10, mounted mobile on a linear axis 20, an application head 3 mounted to the end wrist 11 of the poly-articulated arm, a fiber storage 4 for storing the fibers, a fiber conveyor 5 (FIG. 3) for conveying fibers from the fiber storage to the application head.

Figure 3:
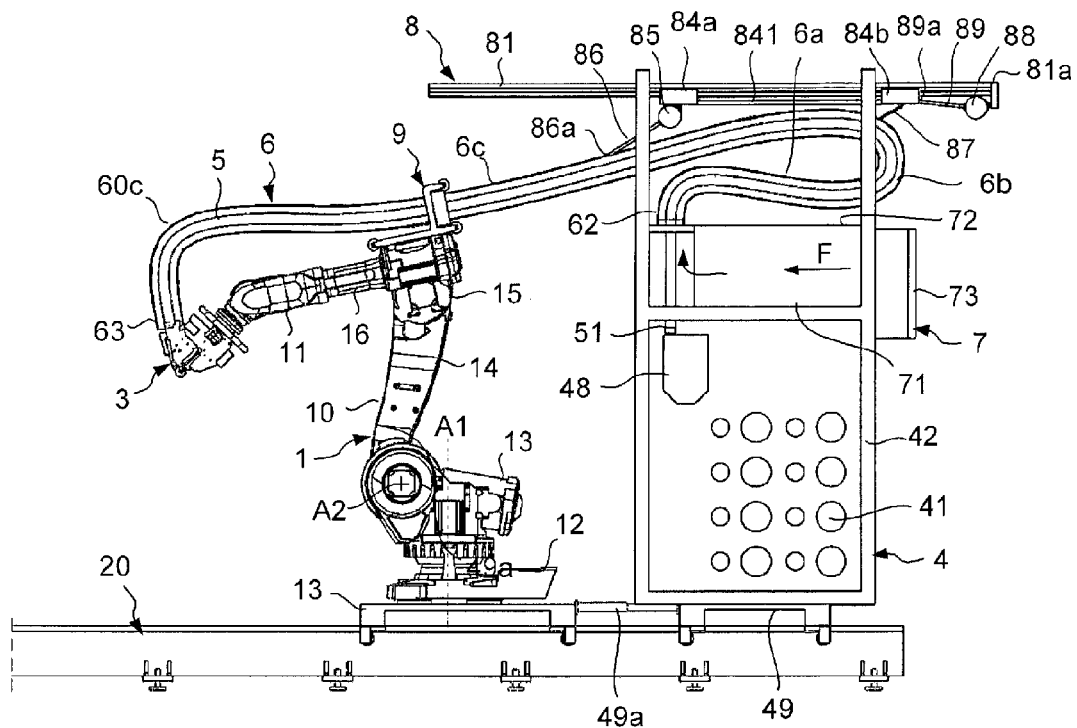
FIG. 3 is a schematic side view of the machine of FIG. 1, illustrating the flexible tubes disposed within the sheath.
Figure 4:
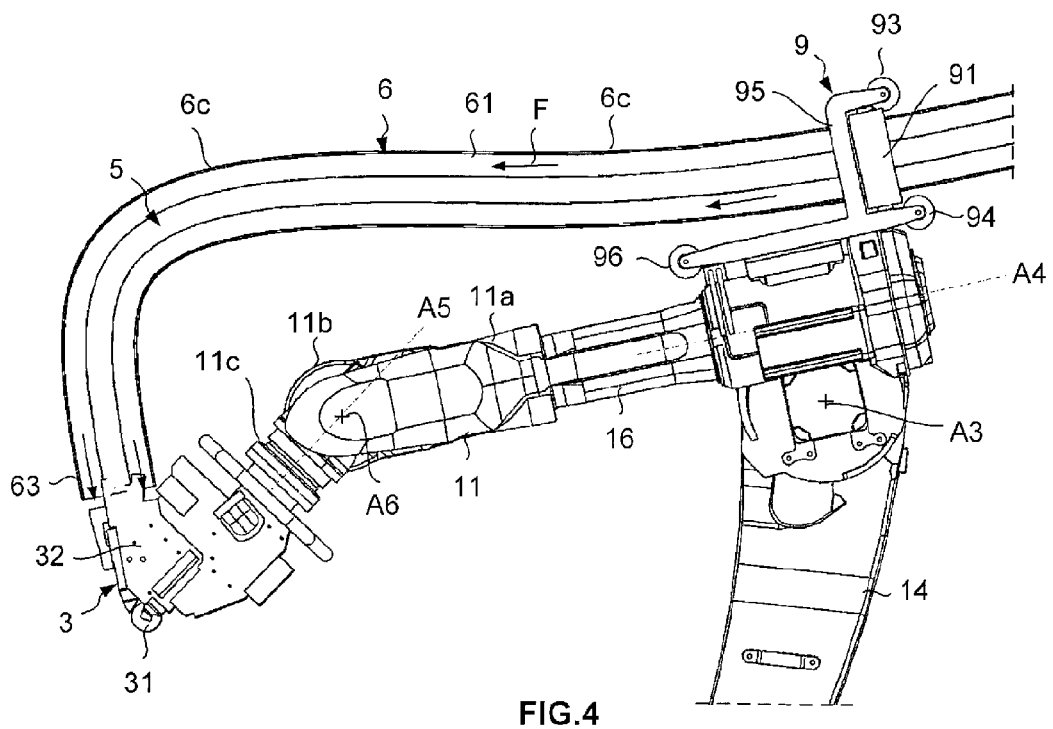
FIG. 4 is an enlarged partial view of FIG. 1, illustrating the poly-articulated arm provided with the head and the guiding ring.

With reference to FIGS. 3 and 4, the poly-articulated arm 10 includes a first section or base 12 and a second, third, forth and fifth sections, 13, 14, 15 and 16, respectively, pivotally assembled to each other around rotation axis A1, A2, A3 and A4, and an end wrist 11 including the last three sections 11a, 11b and 11c of the arm. The end wrist includes a first section 11a whereby the wrist is assembled to the sixth section 16 of the arm, such that the wrist is rotationally mounted around axis A4, a second section 11b pivotally mounted on first section around axis A5, and a third section 11c pivotally mounted on second section around axis A6, this third section, or assembling plate, is intended to carry the fiber application head. The poly-articulated arm 1 is fixed from its base 12 on a carriage 13 slidingly mounted on the linear axis 12, said linear axis being composed of two parallel rails 21 fixed to the ground. The carriage is provided with a driver, for example, a motorized roller type driver, servo-controlled by a controller for displacing the placement head along these rails.

The fiber application head 3, also called fiber placement head, includes, in a known manner, an application roller 31 able to come into contact with a mold for applying a strip composed of a plurality of resin pre-impregnated fibers, and a guiding system 32 for guiding the fibers towards the roller, for example, in two layers of fibers. In order that the strip application be stopped and resumed at any time, and the width thereof be chosen, the head further includes cutting and blocking systems so as to individually cut and block each fiber at the upstream of the roller, as well as rerouting means upstream from the cutting systems in order to individually reroute each fiber that has just been cut.

The machine is provided for applying fibers, for example carbon type fibers packaged in the form of spools. The fiber storage 4 are formed of a creel, schematically denoted under reference 41, to receive the fiber spools. The creel includes a support frame carrying a plurality of mandrels on which the spools are mounted. The creel is incorporated within a cabinet 42 of which hygrometry and temperature will be advantageously controlled. The creel is also mounted on a follower carriage 49, disposed on rails 42 and mechanically connected to the robot holding carriage 13 by a rigid link 49a.

The fiber conveyor includes flexible tubes such as described in the previously cited patent document WO2006/092514. The fibers are individually conveyed in the flexible tubes from the creel 14 to the fiber placement head. The set of tubes is schematically illustrated under reference 5. The set of tubes are fixed at their ends to the creel 41 and head, respectively, with upstream and downstream fixing systems 51, 52, for example, ramp-like systems. For example, the placement head is provided such that it receives two layers of fibers, the flexible tubes being assembled at the head on two rows, with two downstream fixing systems 52.

A tension limiter, such as described in the previously cited patent document, may be provided between the application head and the creel so as to reduce the fiber tension at the roller. In this embodiment, a tension limiting system 48 is integrated within the cabinet, the tubes are fixed to two upstream fixing systems 51 arranged at the exit of the tension limiting system.

These flexible tubes, for example, having a rectangular cross-section and made of plastic such as antistatic high-density polyethylene, exhibit a sufficient length and flexibility so as not to restrict the movements of the displacement system. Such as described in patent document FR 2 882 681, each tube may be provided with a longitudinal flexible blade, limiting or prohibiting the transversal bending of the tube within the blade plane, which makes it possible to suppress, or at least limit the risk of reversal of the fiber, arranged in the internal passage of the flexible tube, parallely to the blade. Moreover, a fluidizing system may be provided so as to fluidize a fiber during the fiber's transport within the internal passage of a flexible tube. This fluidizing system, mounted at the upstream fixing system, is able to inject compressed air within the internal passage of each flexible tube, from its downstream end portion, so as to create an air stream in the fiber transporting direction, and possibly, vibration means to cause the flexible tubes to vibrate.

The machine includes a control unit (not shown) with a man-machine interface intended to control the displacement of the robot according to programmed sequences, the fiber placement head, particularly the jacks of individual cutting systems and rerouting systems, as well as the tension limiting system. The electric, pneumatic and/or hydraulic circuitry, for the supply and the control of the placement head are arranged within a pipe (not shown) extending from the placement head to the control unit along the robot arm.

According to the invention, such as schematically shown on FIGS. 3 and 4, the flexible tubes are disposed within the internal passage 61 of a sheath 6 cooled by a cooling system 7. Sheath 6 is fixed by the sheath 6 open upstream end 62 to the fiber storage and by the sheath 6 open downstream end 63 to the head.

Figures 6A, 6B:
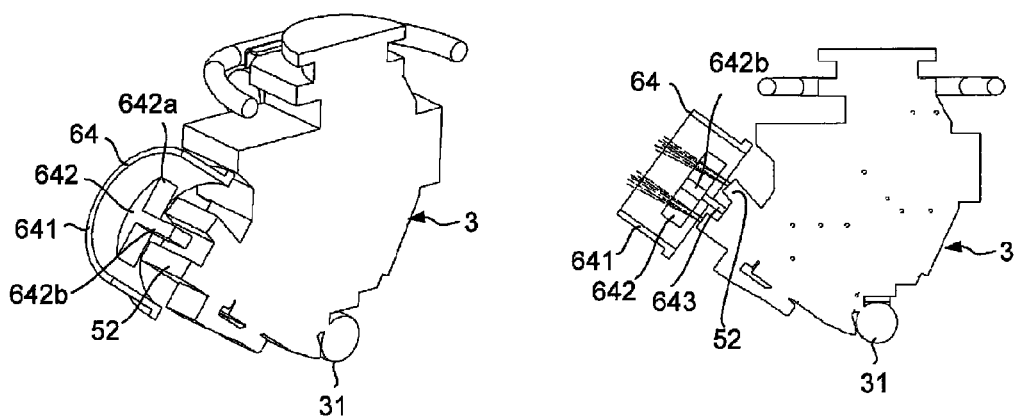
FIGS. 6A and 6B are respectively a schematic sectional and perspective view, and a sectional view, of the head and the sheath downstream portion, illustrating the assembly of the sheath on the head.
Figure 7:
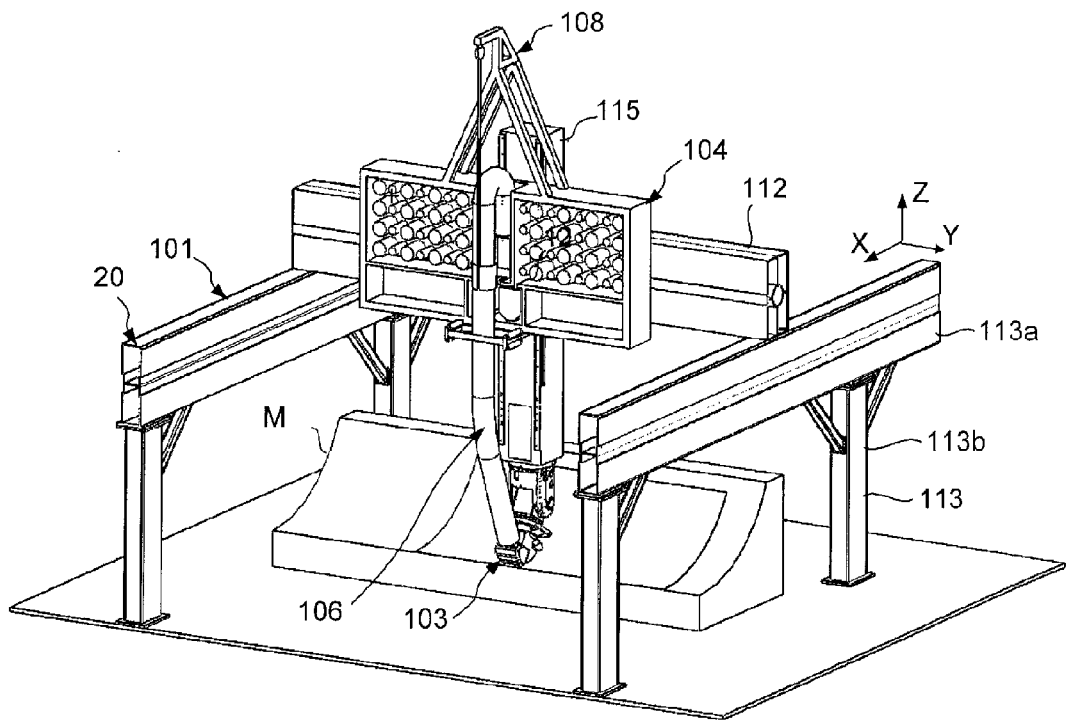
FIG. 7 is a schematic perspective view of a placement machine according to a second embodiment of the invention, wherein the displacement system is a gantry-type Cartesian displacement system with an end wrist provided with the head and the creel mounted on the sliding carriage, the head being in a low position spaced apart from the creel.
Figure 8:
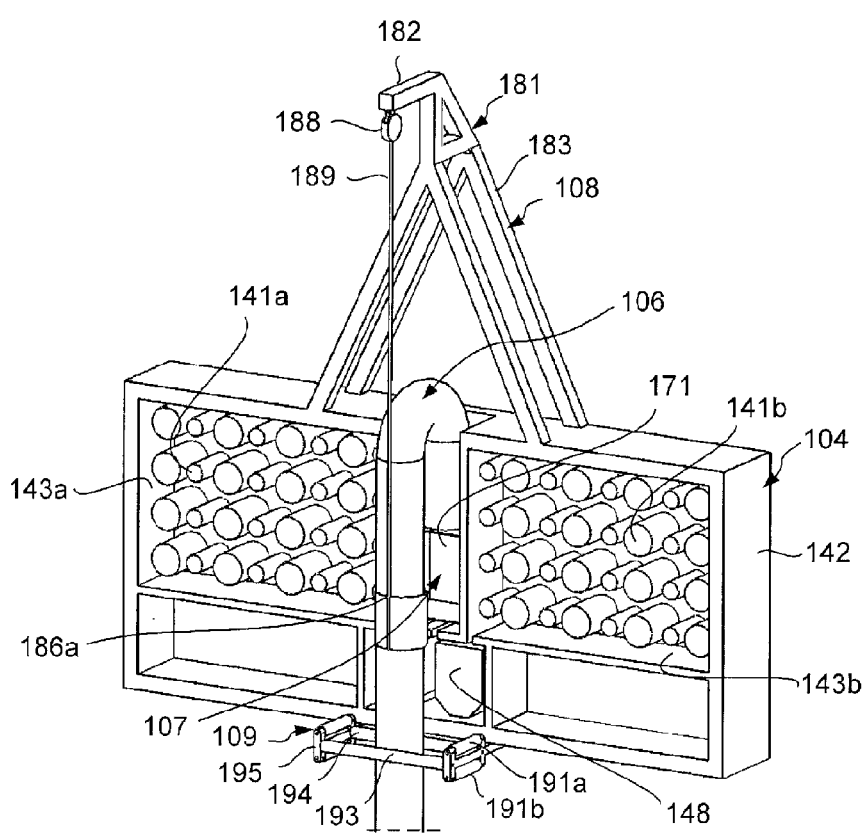
FIG. 8 is an enlarged partial view of FIG. 7, illustrating the creel and the sheath slack recovery system.
Figure 9:
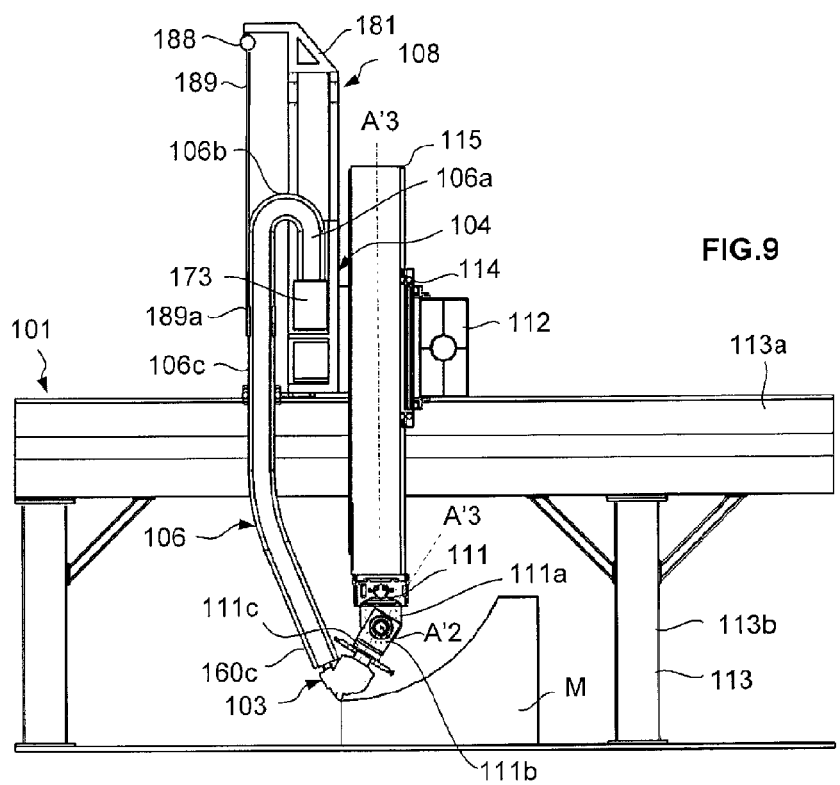
FIG. 9 is a side schematic view of the machine illustrated on FIG. 7.

The sheath is formed of a tubular cover, having for example a substantially circular transversal cross-section, and made of a fabric of tight thermoplastic material, for example, polyurethane, reinforced with a metal frame, the metal frame being for example composed of a helical metal wire extending from the upstream end to the downstream end of the sheath. Alternatively, the sheath is a robotic ringed flexible sheath, made of polyurethane or polyamide. With reference to FIGS. 6A and 6B, the downstream end of the sheath is provided with an assembling rigid flange 64 intended for assembling on the head. The flange comprises a rigid tube 641 on which the downstream end 63 of the sheath is fitted and fixed, and a generally H shaped assembling part 642, fixed through arms 642a to the internal wall of the rigid tube and of which central bar 642b is provided with rods 643 able to snap-fit within holes of the head arranged between the two downstream fixing systems 52 of the flexible tubes. Such as schematically illustrated by dashed lines on FIG. 6B, the flexible tubes are arranged on either side of the central bar 642b so as to be fixed by ends of the flexible tubes to said downstream fixing systems 52.

The cooling system 7 includes a parallelepiped box 71 mounted on the cabinet top wall. The flexible tubes pass through an opening of the top wall 72 of the cabinet, extending substantially vertically from the tension limiting system 48 inside the box, and passing through an opening of the top wall 72 of the box. The upstream end 62 of the sheath is assembled by a flange 65 (FIG. 5) on the box top wall 72, at the opening, such that its internal passage 61 opens inside the box. The cooling system further includes a cooling unit 73, mounted on one of the side walls of the box, able to form a pulsed cool air stream within box 71 and within the internal passage of the sheath, such as schematically illustrated by arrows F on FIGS. 3 and 4. Typically, the cooling unit, or air heater, comprises an air inlet, opening onto the outside, a pulsed air outlet opening inside the box, a fan or pulser for drawing outside air by said air inlet and blowing towards the pulsed air outlet, and a heat exchanger for cooling the drawn air. The cool air stream thus enters from the open upstream end 62 of the sheath and exits from the open downstream end 63 of the sheath, such as illustrated on FIG. 4. This pulsed cold air stream makes it possible to cool the flexible tubes as well as the fiber placement head. Each flexible tube may be bulk cooled from the outside, by conduction, such that its internal passage as well as the fiber passing through its internal passage be cooled. The transversal cross-section of the sheath is defined such that it is greater than the sum of the transversal cross-sections of the flexible tubes. In an embodiment of the present invention, to ensure a proper cooling of each flexible tube, the flexible tubes are not grouped by attaching systems to form a bundle of tubes packed against each other. The flexible tubes are grouped within the sheath while remaining free to move relatively to each other within the sheath, such that each tube may be directly contacted by the stream of cold air. For example, the cooling unit forms a stream of pulsed air, the temperature of which, in an embodiment is between 5° C. and 15° C., for example of about 13° C., such that the fibers are maintained, from the fiber storage to the application head, at a temperature substantially equivalent to that of the pulsed air.

The sheath exhibits a length and flexibility sufficient enough so as not to limit the movements of the poly-articulated arm. To prevent the sheath from interfering with the displacements of the head and/or from coming against the mold when the head is close to the creel, such as illustrated in FIG. 5, the machine comprises a slack recovery system 8, also called tensioning system, acting upon the sheath such that the downstream portion 60c of the sheath, which extends along the end wrist, remains stretched.

Said slack recovery system 8 includes a rail 81 mounted, parallel to the linear axis 20, above the creel and the box 71. In order to mount the rail, the cabinet is provided at its four corners, with a vertical post, the rear posts 82a and the front posts 82b are respectively connected to each other with a rear cross-bar 83a and front cross-bar 83b, the rail being fixed under said cross-bars. A first slider 84a is slidingly mounted on the rail and bears an automatic cable winder 85, of spiral spring type for example, the free end 86b of the cable 86 thereof being fixed to the sheath. The first slider is connected through a rigid link 841 to a second slider 84b, also slidingly mounted on the rail, this second slider being connected to the free end 89a of the cable 89 of a second automatic cable winder 88 assembled to the rear end 81a of the rail. This rail rear end is arranged rearward of the cabinet.

The free end 86a of cable 86 of the first winder 85 is assembled to the sheath such that the sheath 6 is in the form of a first variable length strand 6a including the upstream end 62 of the sheath and connected through a substantially U-shaped bend portion 6b, to a second variable length strand 6c, including the downstream portion 60c of the sheath assembled to the head by the downstream end 63. The free end 86a of the cable of the first winder is assembled at a point of the second strand. The first strand 6a forms, with the bend portion 6b and the second strand 6c a variable size loop arranged above the creel, between posts 82a, 82b. Thus, the downstream portion of the sheath is pulled rearward, the sheath surplus length being always arranged at the creel in the form of a loop.

Figure 5:
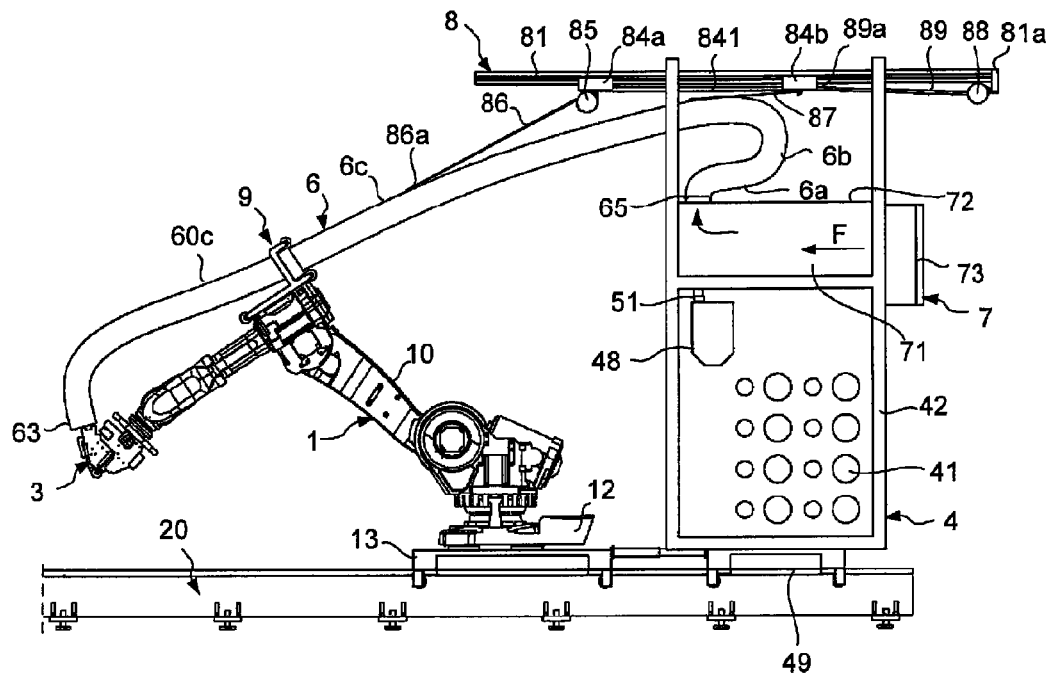
FIG. 5 is a schematic side view similar to FIG. 4, on which the head is in a position further apart from the creel.

When the head is brought to a position spaced apart from the creel, such as illustrated on FIG. 5, the sheath pulls the cable 86 which unwinds from winder 85. Moreover, the first slider bearing winder 85 which is connected to the second slider 84b, pulls cable 89 which unwinds from winder 88, sliders 84a, 84b moving along the rail. The rail exhibits a front portion which is arranged in front of the cabinet, above the base 12 of the poly-articulated arm 10, on which slides the first slider when the head is spaced apart from the creel. When the head is returned by the poly-articulated arm in a position close to the creel, cable 89 winds up in the winder 88, and pulls the sliders rearwards. Likewise, cable 86 automatically winds around winder 85. Alternatively, the first winder 85 of cable 86 is replaced by an elastic cable or a fixed length cable connected at one end thereof to the first slider and to the sheath.

Preferably, the second slider is connected, via an elastic cable 87, such that the sheath is elastically biased rearwards by the bend portion.

Figure 2:
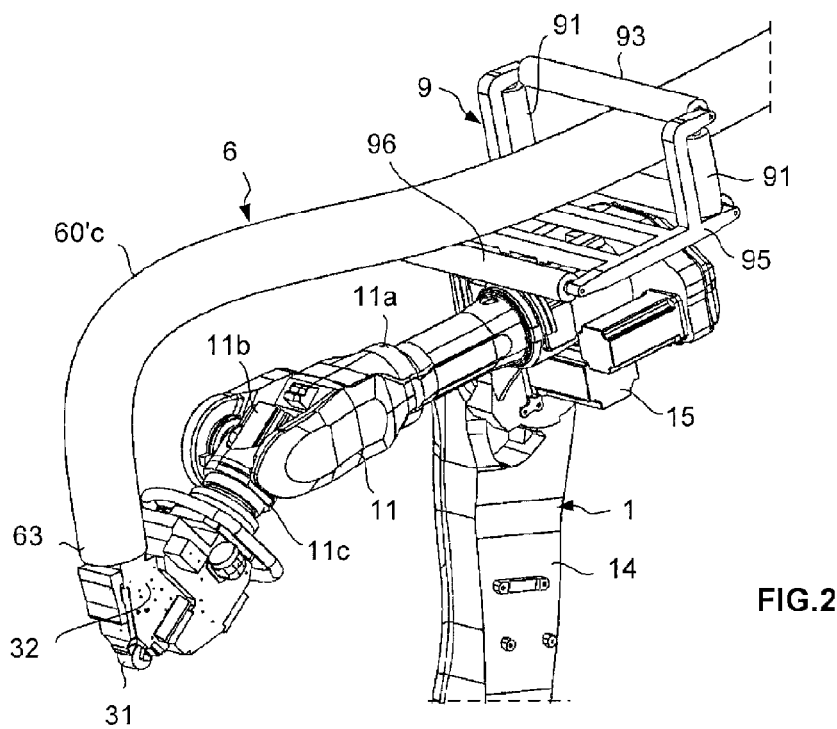
FIG. 2 is an enlarged partial view of FIG. 1, illustrating the poly-articulated arm provided with the head and with a guiding ring for the sheath.

With reference to FIGS. 2 and 4, the sheath advantageously passes through a guiding ring 9 mounted on the poly-articulated arm in order to guide the sheath upstream from the end wrist. This guiding ring is mounted on the fifth portion 15 of the poly-articulated arm and is formed of two lateral rollers 91, a top roller 93 and a bottom roller 94, said rollers being rotationally mounted on a support chassis 95 assembled on the fifth portion 15 of the poly-articulated arm. The chassis bears a second bottom roller 96 arranged downstream of the rollers forming the ring, over the sixth portion 16, in order to avoid any friction of the sheath with the sixth portion and the robot end wrist.

FIGS. 7 to 10 illustrate a second embodiment in which the fiber placement head is mounted on a gantry type displacement system. The placement machine includes a gantry type displacement system 101 with an end wrist 111, a placement head 103 connected to a fiber storage 104 by a fiber conveyor comprising, as before, flexible tubes placed within a sheath 106.

The gantry type displacement system 101 includes a first carriage 112 mounted mobile along a first horizontal direction X between two parallel support bars 113a of a gantry 113, a second carriage 114 (FIG. 9) mounted mobile on the first carriage 112 along a second horizontal direction Y perpendicular to the first one, and a third carriage 115, also called sliding carriage, mounted vertically mobile on the second carriage 114 along a third vertical direction Z. The displacements of the three carriages are made possible through driver embedded on each one of them, and servo-controlled by a main controller of the machine. The wrist 111, of three axis robot wrist type, is pivotally mounted at the lower end of the third carriage 115 around a vertical rotation axis. According to FIG. 9, the wrist includes three sections, a first one 111a whereby the wrist is pivotally mounted on the third carriage around a vertical axis A'1, a second section 111b pivotally mounted on the first section around an axis A'2, and a third section 111c pivotally mounted on the second section around an axis A'3, this third section carrying the placement head for the displacement thereof above a mold M disposed between the gantry posts 113b.

As before, the machine is intended for applying fibers, for example of carbon fiber type, packaged in the form of spools and entering in the head in the form of two layers. According to FIG. 8, the fiber storage comprise two creels 141a, 141b to receive the fiber spools, the creels being horizontally slidingly mounted on the second carriage 114. Both creels are embedded within two compartments 143a, 143b of a cabinet 142 which is fixed, through its rear wall, on the second carriage 114, in front of the sliding carriage 115, both compartments being arranged symmetrically on either side of the sliding carriage. Each creel is intended for the implementation of a layer of fibers and is associated to a tension limiting system 148 positioned within a lower compartment of the cabinet.

The cooling system 107 includes a cooling unit 171 arranged between both compartments 143a, 143b of the cabinet, the cooling unit includes a substantially parallelepiped case comprising on a top wall a pulsed air outlet at which are assembled the flexible tubes upstream fixing system, as well as the open upstream end of the sheath. As before, the cooling unit 173 draws outside air, for example via an air inlet opening at the rear wall of the cabinet, and creates a pulsed cold air stream within the sheath. The fibers exiting the tension limiting system 148 pass through an opening of the bottom wall of the cooling unit, cross this cooling unit, and pass through the flexible tubes.

The sheath slack recovery system 108 includes a bracket 181 mounted on the cabinet and which rises above the top wall of the cabinet. The cross-bar 182 of the bracket, which is mounted at the higher end of a leg assembly 183, integral with the cabinet, comprising, for example, four columns, is arranged according to the vertical median plane of the sliding carriage 115 and exhibits an end arranged beyond the front face of the cabinet to which an automatic cable winder 188 is assembled.

The free end 189a of cable 189 of this automatic winder 188 is assembled to the sheath 106 such that the sheath has the form of a first strand 106a connected, via a substantially U-shaped bend portion 106b, to a second strand 106c. The first strand is arranged between the two compartments and includes the sheath upstream end. The second strand includes the sheath downstream strand 106c arranged along the wrist. The free end 189a of winder cable 189 is assembled to the second strand. The first strand forms, with the bend portion and the second strand, a variable size loop arranged between the creels. Thus, the downstream portion 160c of the sheath is elastically vertically pulled upwards. The cable winder 188 makes it possible to automatically return the sheath length surplus upwards, particularly when the head moves from a position spaced apart from the creel such as illustrated on FIGS. 7 and 9, to a position close to the creel such as illustrated on FIG. 10.

The second strand 106c of the sheath advantageously passes within a guiding ring 109 arranged at the lower part of the cabinet. This guiding ring is formed of a front roller 193, a rear roller 194, two higher lateral rollers 191a and two lower lateral rollers 191b, the rollers being rotationally mounted on a support chassis 195 assembled to the bottom wall of the cabinet.

Figure 10:
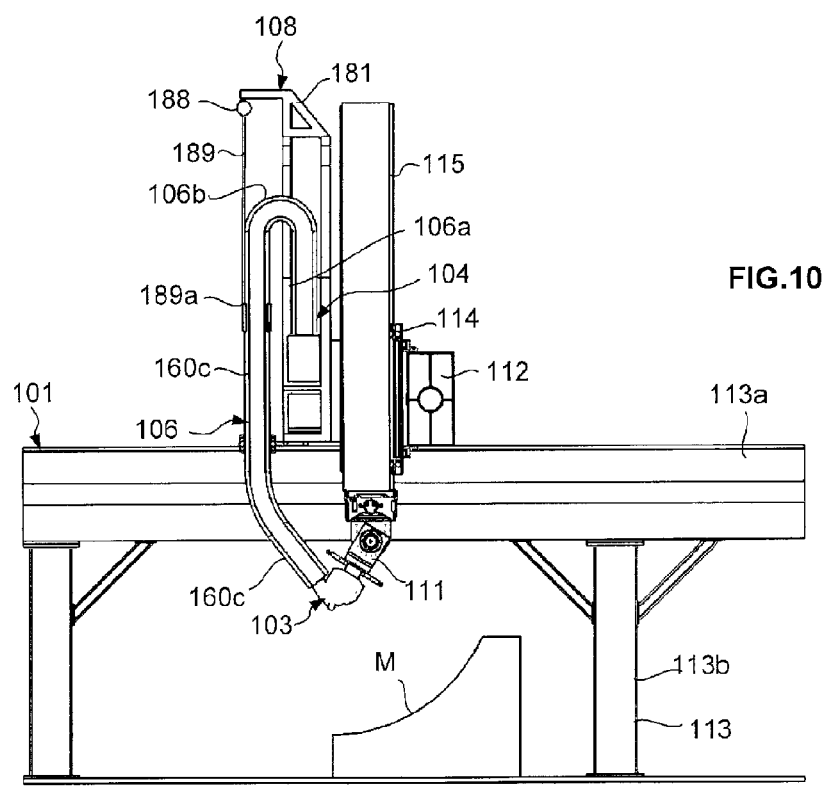
FIG. 10 is a view similar to FIG. 9, the head being in a high position, proximate to the creel.
Figure 11:
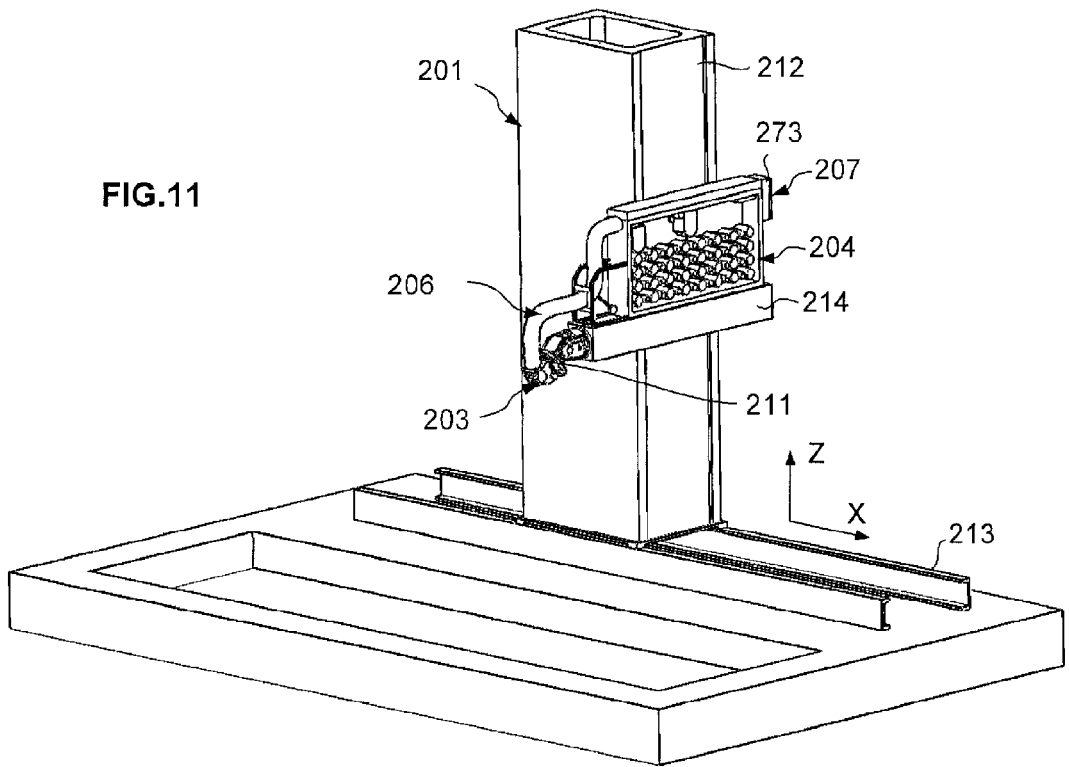
FIG. 11 is a schematic perspective view of a placement machine according to a third embodiment of the invention, wherein the placement system is a columnar type Cartesian displacement system with an end wrist provided with the head and the creel mounted on the sliding carriage; and, FIG. 12 is an enlarged partial view of FIG. 11.
Figure 12:
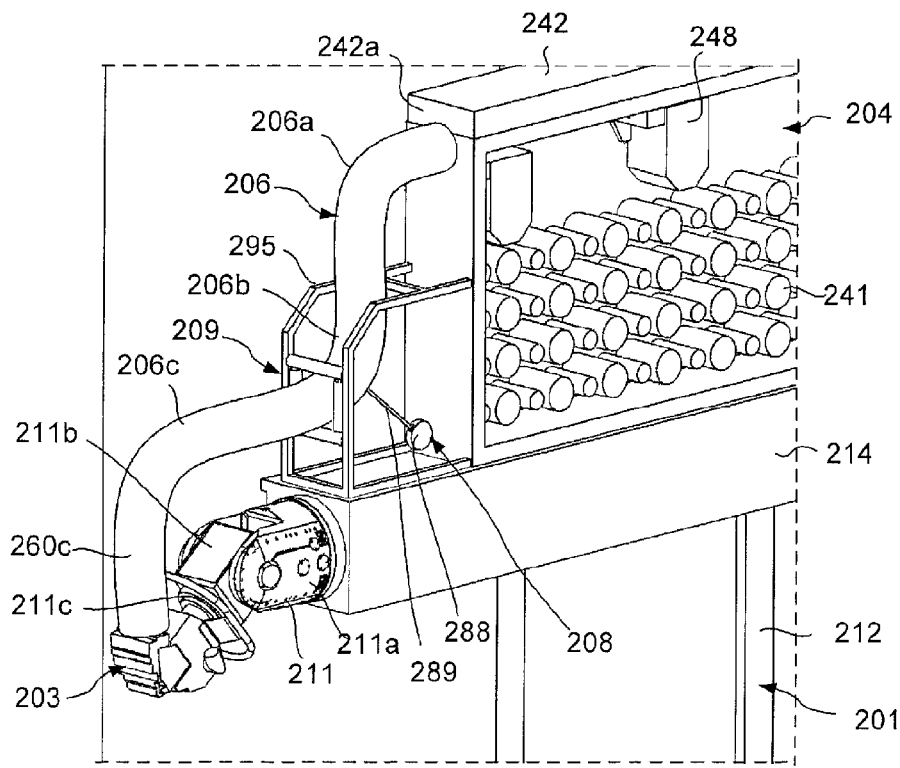

FIGS. 10 and 11 illustrate a third embodiment wherein the fiber placement head is mounted on a columnar type displacement system. The placement machine includes a columnar type displacement system 201 with a wrist 211, a placement head 203 connected to fiber storage 204 by fiber conveyor comprising flexible tubes placed in a sheath 206.

The displacement system 201 comprises a vertical column 212 mounted mobile along a first horizontal direction X on two horizontal rails 213, and a carriage 214, or sliding carriage, mounted vertically mobile on the column along a vertical direction Z, the displacements of the column and the carriage being performed by the driver embedded and servo-controlled by a main controller of the machine. The wrist 211, of a three axis robot wrist type, has three sections 211a, 211b, 211c, such as described previously. The wrist is pivotally mounted from its first section 211a to a side end of the carriage around a horizontal rotation axis. The third section 211c bears the placement head for displacing the same above a mold arranged close to the rails, at the wrist side.

The fiber storage comprise a creel 241 for receiving fiber spools, the creel being integrated within a parallelepiped cabinet 242 which is fixed, from its bottom wall, on the carriage. Two tension limiting systems 248 are placed within the cabinet so as each receives the fibers of a fiber layer.

Each fiber passes in a flexible tube fixed from one end thereof to a downstream fixing system integral with the tension limiting system and to a downstream fixing system integral with the head, the set of tubes passing through an opening located at the top part of the lateral wall 242a of the cabinet which is disposed at the end wrist side. The open upstream end of the sheath is assembled, via a flange, at said opening.

The cooling system 207 includes a cooling unit 273 assembled to the cabinet, arranged for example against the lateral wall opposed to the wrist, the unit being able to blow cooled pulsed air directly inside the cabinet, the cool pulsed air passing by the open upstream end of the sheath to exit by the open downstream end of the sheath. Hence, the unit makes it possible to cool the interior of the cabinet as well as the sheath and the head.

In this embodiment, the sheath length surplus that has to be removed when the head is close to the creel remains low. The slack recovery system 208 of the sheath includes an automatic cable winder 288 assembled at the lower part of the lateral wall 242a, the free end of the cable 289 of the automatic winder is assembled to the sheath 206 such that the sheath has the shape of a first strand 206a, including the sheath upstream end, which is connected via a substantially 90° elbow shaped bend portion 206b, to a second strand 206c which substantially corresponds to the downstream portion 260c of the sheath arranged along the end wrist. The free end 289a of winder cable 289 is assembled to the bend portion. Thus the sheath downstream portion is elastically laterally pulled towards the creel.

Downstream of the cable attachment point, the sheath advantageously passes within a guiding ring 209 arranged above the wrist, substantially at the assembling plane of the wrist and the carriage. This guiding ring is formed of a horizontal higher roller, a horizontal lower roller, two vertical lateral rollers, said rollers being rotationally mounted on a support chassis 295 assembled to the carriage and to the lateral wall of the cabinet.

Although the invention has been described in relation with various particular embodiments, it is to be understood that it is in no way limited thereto and that it includes all the technical equivalents of the means described as well as their combinations should these fall within the scope of the invention.

The invention claimed is:

1. A fiber application machine comprising:
a displacement system for displacing a fiber application head,
a fiber storage, and
a fiber conveyor for conveying the fibers from the fiber storage to the application head,
wherein the fiber conveyor is placed in the internal passage of at least one flexible tubular sheath, the machine further including a cooling system for injecting a cold gas into the internal passage of the sheath.

2. A machine according to claim 1, wherein the fiber conveyor includes flexible tubes, each flexible tube adapted to receive a fiber in the internal passage thereof, the flexible tubes being arranged in the internal passage of at least one flexible sheath.

3. A machine according to claim 1, wherein the sheath extends from an upstream end disposed at the fiber storage to an open downstream end disposed at the application head, the cold gas injector adapted to inject cold gas in the internal passage of the sheath from the upstream end of the sheath, the injector creating within the sheath a cold gas stream directed towards the application head, exiting from the open downstream end.

4. A machine according to claim 1, wherein the sheath is assembled by the upstream end and the downstream end to the fiber storage and to the application head respectively, by an upstream and downstream fixing system, respectively, the sheath exhibiting sufficient length and flexibility so as not to restrict the movements of the head displacement system.

5. A machine according to claim 4, further including a slack recovery system, acting upon the sheath such that at least the downstream portion of the sheath remains substantially tight, whatever the head position is.

6. A machine according to claim 5, wherein the slack recovery system further includes an elastic return system elastically connecting a point of the sheath to a point of the machine which is fixed with respect to the fiber storage, such that the sheath forms a first strand of variable length connected to the fiber storage and connected via a bend portion to a second strand of variable length, the second strand including the sheath downstream portion, the elastic return system adapted to connect at a point of the second strand and/or the bend portion.

7. A machine according to claim 6, wherein the elastic return system includes at least one automatic cable winder, one of the members among the winder and the free end of the cable adapted to connect to the point of the machine, the other member being fixed to the second strand or to the bend portion of the sheath.

8. A machine according to claim 7, wherein the slack recovery system includes a slider mounted on a rail fixed to the fiber storage, the slider being connected to the sheath via a cable and elastically connected, via said automatic winder of cable, to an end of the rail opposed to the application head, the cable connecting the slider to the sheath being the cable of a second automatic winder.

9. A machine according to claim 6, wherein the displacement system comprises a six axis robot type poly-articulated arm, the fiber storage including a creel for receiving fiber spools, integrated within a cabinet, the first strand of the sheath formed with the bend portion and the second strand being a variable size loop disposed above the creel.

10. A machine according to claim 6, wherein the displacement system is a Cartesian-type displacement system including, a first carriage having a lower end mounted mobile along a horizontal direction, and a second carriage, mounted vertically mobile on the first carriage and provided at the lower end with a robot wrist carrying the head, the fiber storage including at least one creel for receiving fiber spools mounted either on the first carriage, or the second carriage.

11. A machine according to claim 5, wherein the displacement system is provided with a guiding ring into which the second strand of the sheath passes.

12. A machine according to claim 1, wherein the cooling system includes a cooling unit able to form a pulsed cold air stream in the internal passage of the sheath.

\* \* \* \* \*

UNITED STATES PATENT AND TRADEMARK OFFICE
CERTIFICATE OF CORRECTION

| | | |
|---|---|---|
| PATENT NO. | : 8,667,999 B2 | Page 1 of 1 |
| APPLICATION NO. | : 13/126736 | |
| DATED | : March 11, 2014 | |
| INVENTOR(S) | : Hamlyn et al. | |

It is certified that error appears in the above-identified patent and that said Letters Patent is hereby corrected as shown below:

In the Specification

Column 7, Line 45:

Delete "always".

Signed and Sealed this
Fifteenth Day of September, 2015

Michelle K. Lee
*Director of the United States Patent and Trademark Office*